United States Patent [19]

Gloth et al.

[11] 4,417,017

[45] Nov. 22, 1983

[54] POLYMERIC ANTIOXIDANTS PREPARED FROM DIPHENYALMINE AND DIALKYLALKENYLBENZENE OR DIHYDROXYALKYLBENZENE

[75] Inventors: Richard E. Gloth, Copley; James J. Tazuma, Stow, both of Ohio

[73] Assignee: The Goodyear Tire & Rubber Company, Akron, Ohio

[21] Appl. No.: 460,977

[22] Filed: Jan. 26, 1983

[51] Int. Cl.³ ............................................. C08K 5/18
[52] U.S. Cl. ................................................ 524/255
[58] Field of Search ............... 524/255; 564/326, 327, 564/330, 433; 528/392, 422

[56] References Cited

U.S. PATENT DOCUMENTS

| | | | |
|---|---|---|---|
| 2,200,756 | 5/1940 | Messer et al. | 564/433 |
| 3,505,225 | 4/1970 | Wheeler | 252/47.5 |
| 3,533,992 | 10/1970 | Sundholm | 524/255 |
| 3,714,257 | 1/1973 | Bayha et al. | 564/409 |
| 3,714,258 | 1/1973 | Bayha et al. | 564/409 |
| 3,904,578 | 9/1975 | Kawase et al. | 524/334 |
| 3,987,004 | 10/1976 | Georgoudis | 524/108 |

FOREIGN PATENT DOCUMENTS 1768697 12/1971 Fed. Rep. of Germany.

OTHER PUBLICATIONS

A. Fritz et al., "Synthesis of Arylene isopropylidene Polymers,"-J. Polymer Science, vol. 10, pp. 2365-2378 (1972).
Armianskii Khimicheskii Zhurnal 28(7), pp. 551-554 (1975).

*Primary Examiner*—Veronica Pittoke
*Attorney, Agent, or Firm*—R. D. Thompson

[57] ABSTRACT

A class of novel polymeric diphenylamine compounds are used to provide antioxidant protection to oxidizable polymers. In particular, the polymeric reaction products of diphenylamine and 1,4-diisopropenylbenzene are used in acrylonitrilebutadiene and styrene-butadiene rubbers to protect these rubbers in high temperature, oxidative working environments.

10 Claims, No Drawings

POLYMERIC ANTIOXIDANTS PREPARED FROM DIPHENYALMINE AND DIALKYLALKENYLBENZENE OR DIHYDROXYALKYLBENZENE

BACKGROUND OF THE INVENTION

This invention relates to the use of new polymeric products of the reaction of diphenylamine with a di-α alkylalkenylbenzene or di-α-hydroxyalkylbenzene as antioxidants. It is particularly concerned with their use in organic polymers, especially synthetic and natural rubbers which are subject to oxidative degradation.

BACKGROUND ART

Amine antioxidants are widely used to protect most types of synthetic and natural rubber, particularly rubbers containing olefinic linkages which are subject to oxidative attack, especially at high temperatures. The use of amine antioxidants has been limited by the fact that they usually discolor and/or stain an adjacent surface. Early amine antioxidants based on paraphenylenediamine were effective but also highly discoloring and staining and thus unuseable in light colored rubber articles. Alkyl substituted diphenylamines, such as octylated and nonylated diphenylamines provided improved staining characteristics and were only moderately discoloring, but the level of antioxidant protection provided was found to be marginal in many high temperature applications. Mono and diaryl substituted diphenylamines exhibited generally lower volatility and better long range oxidation protection than the alkyl substituted diphenylamines. However, aryl-substituted diphenylamines such as stryenated diphenylamines were found to provide inadequate long-term antioxidant protection in severe, high temperature applications such as under-the-hood automotive applications requiring oil-resistance. In automotive hoses, seals, gaskets and belts using acrylonitrile-butadiene rubber (NBR) improved long term protection was required. What was needed was a higher molecular weight, low volatility antioxidant which exhibited minimal discoloration and staining tendencies. Thus it is evident that an antioxidant which provided such desired characteristics would be an advancement over antioxidants presently known in the art.

BRIEF DESCRIPTION OF THE INVENTION

This invention provides improved rubber compositions which retain the desirable physical properties during long duration exposure in high temperature environments. An aspect of this invention is a polymer subject to oxidation having incorporated therein an antioxidant amount of a polymeric diphenylamine compound of randomly distributed repeat units derived from diphenylamine and an additional component, said additional component comprising one or more compounds of structural formula (10)

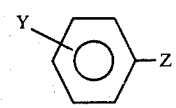
(10)

said polymeric compound containing one or more of structures V, VI and VII:

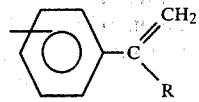
(V)

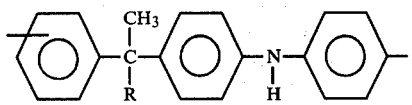
(VI)

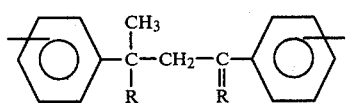
(VII)

wherein Y is para or meta relative to Z, Y and Z are the same or different radicals selected from the group consisting of

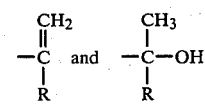

and R is an alkyl radical of from 1 to 8 carbon atoms.

More Detailed Description

The polymers that may be conveniently protected by the compounds described herein are oxidizable vulcanized and unvulcanized polymers susceptible to oxygen degradation, such as natural rubber, balata, gutta percha and oxidizable synthetic polymers including those containing carbon to carbon double bonds, such as rubbery diene polymers, both conjugated and nonconjugated. Representative examples of the synthetic polymers used in the practice of this invention are polychloroprene, homopolymers of a conjugated 1,3-diene such as isoprene and butadiene, and in particular polyisoprenes and polybutadienes having from 99 to 40 percent of their repeat units combined in a cis-1,4 structure; copolymers of a conjugated 1,3-diene such as isoprene and butadiene with up to 50 percent by weight of at least one copolymerizable monomer including ethylenically unsaturated monomers such as styrene and acrylonitrile; butyl or halobutyl rubbers which are a polymerizable product of a major proportion of a monoolefin and a minor proportion of a multiolefin such as butadiene or isoprene; polyurethanes containing carbon to carbon double bonds; and polymers and copolymers of monoolefins containing little or no unsaturation, such as polyethylene, polypropylene, ethylene propylene copolymers and terpolymers of ethylene, propylene and a nonconjugated diene such as dicyclopentadiene, 1,4-hexadiene, ethylidene norbornene and methylene norbornene. Lubricating oils and greases may also be protected.

The antioxidants of this invention may be used with or without other stabilizers, synergists, vulcanizing agents, accelerators or other compounding ingredients. In order to effectively stabilize polymers, small proportions of one or more of the polymeric diphenylamine antioxidants in accordance with this invention are added to the polymer in a customary antioxidant amount which may vary somewhat depending upon the type and requirements of the polymers to be protected. The compounds of this invention are useful in protecting polymer in any form, for example, polymers in latex form, unvulcanized polymer and vulcanized polymer.

The method of addition of the antioxidant to the polymer is not critical. It may be added by any of the conventional means such as by adding to a polymer latex or solution, milling on an open mill or by incorporating in an internal mixer such as a banbury.

Normally from about 0.001 part to about 10.0 parts of the antioxidant by weight based on the weight of the polymers can be used, although the precise amount of these polymeric diphenylamine compounds to be employed will depend somewhat on the nature of the polymer and the severity of the deteriorating conditions to which the polymer is to be exposed. In unsaturated polymers such as those made from conjugated dienes, e.g. rubbery butadiene/styrene polymers, the amount of antioxidant necessary is greater than that required by saturated polymers such as polyethylene, polypropylene and ethylene-propylene rubbers.

The antioxidants for use in the practice of this invention are prepared by reacting diphenylamine with at least one additional reactant or component selected from compounds having the structural formula (10) as set forth above. The preferred reactants have structural formulae (I), (II), (III) and (IV).

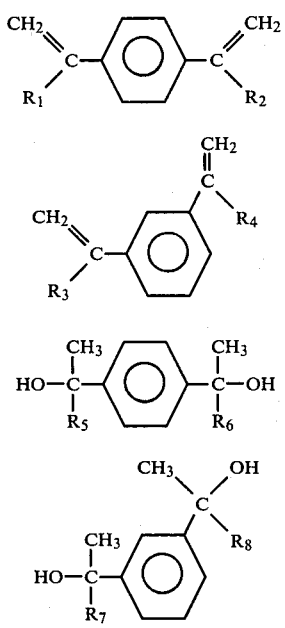

wherein $R_1$, $R_2$, $R_3$, $R_4$, $R_5$, $R_6$, $R_7$, and $R_8$ are the same or different radicals selected from the group consisting of alkyl groups of from 1 to 8 carbon atoms. Compounds of structures III and IV quite readily undergo a dehydration reaction to form the diolefin of corresponding structure in I and II.

Illustrative compounds of Structure I are 1,4-diisopropenylbenzene, 1,4-di-α-ethylvinylbenzene, 1-isopropenyl-4-α-ethylvinylbenzene, 1-α-ethylvinyl-4-α'-isopropylvinylbenzene, and 1,4-di-α-isopropylvinylbenzene.

Illustrative compounds of Structure II are 1,3-diisopropenylbenzene, 1,3-di-α-ethylvinylbenzene, 1-isopropenyl-3-α-ethylvinylbenzene, 1-α-ethylvinyl-3-α'-isopropylvinylbenzene, and 1,3-di-α-isopropylvinylbenzene.

Illustrative compounds of Structure III are 1,4-di-(α-hydroxyisopropyl)benzene, 1,4-di-(α-hydroxysec-butyl)benzene, 1-(α-hydroxyisopropyl)-4-(α-hydroxy-sec-butyl)benzene, 1,4-di-(α-hydroxy)-sec-amylbenzene, and 1-(α-hydroxyisopropyl)-4-(α-hydroxy-sec-amyl)benzene.

Illustrative compounds of Structuve IV are 1,3-di-(α-hydroxyisopropyl)benzene, 1,3-di-(α-hydroxysec-butyl)benzene, 1-(α-hydroxyisopropyl)-3-(α-hydroxy-sec-butyl)benzene, 1,3-di-(α-hydroxy)-sec-amylbenzene, and 1-(α-hydroxyisopropyl)-3-(α-hydroxy-sec-amyl)-benzene.

The most preferred reactants are those having a methyl group in the position noted by $R_1$ through $R_8$ herein above, namely, 1,3 or 1,4-diisopropenylbenzene; and 1,3 or 1,4-di-(α-hydroxyisopropyl)benzene. The compounds of Structures I and II will be sometimes referred to in subsequent discussion of the reaction as a diolefin or as the diolefinic alkylating agent and compounds of Structures III and IV will be referred to as a dialcohol or as the dialcoholic alkylating agent.

The term polymeric compound means large molecules composed of more than one occurrence of at least one of the beginning reactants. The terms polymer, polymeric diphenylamine compound or polymeric diphenylamine antioxidants may be used interchangeably with polymeric compound. The simple compounds formed by the reaction of a single diphenylamine molecule with a single molecule of the second reactant are specifically excluded from the term polymeric compound as used herein. A practitioner will recognize that the initial structure of the reactant will be altered during linkage to the adjacent unit in the larger molecule. The term repeat unit means a structure that occurs more than once in the polymeric compound and which differs from the structure of the initial reactant due to changes resulting from molecular reorientation during the linking to the adjacent structure. The changes may include, but are not limited to, addition to a double bond and, addition or removal of a hydrogen atom from the initial reactant.

Catalysts useful in the production of antixodiants for this invention are the Bronsted acid and Lewis acid type catalysts known to be useful in alkylation reactions. Such known catalysts include protonic acids such as $H_2SO_4$, $HCL$, $H_3PO_4$, $HClO_4$; metal halides such as $BF_3$, $BCl_3$, $AlCl_3$, $AlBr_3$, $SnCl_4$, $ZnCl_2$, $SbCl_3$ and their etherates; acidic clay; acid-activated clays and silica-aluminas. The choice of a particular catalyst is dependent upon many factors including the melting or boiling points of the reactants, desired rate of reaction, solvent, and pressure and temperature limitations of the production equipment, etc. The acidic clay catalysts offer the advantage of easy separation after the reaction is complete. Materials representative of this class of catalyst include the Filtrol (Filtrol Corporation) and Girdler K-series clays (Chemetron Corporation) or silica-alumina catalysts such as Durabead I (Mobil Oil Corporation). The Filtrols are acid-activated crystalline clays composed essentially of silica and alumina. The acid numbers of the clays range from 1.2 to 16. Super Filtrol Grade 1 has an acid number of 8. The Girdler K-series catalysts are acid-activated clays produced from the mineral Montmorillonite, an aluminum hydrosilicate with ideal formula $Al_2O_3.4SiO_2.H_2O+XH_2O$. Their acidity ranges from pH2.1 to pH greater than 4. Durabead catalysts are non-zeolitic coprecipitated silica-aluminas of low crystallinity. When higher yields are desired the metal halides or their etherates may be utilized.

The reactions can be carried out without solvent at or above the melting points of the reactants or can be carried out in a solvent. The solvent can be an aliphatic $C_6$ to $C_{12}$ hydrocarbon or an aromatic or haloaromatic ($C_6$ to $C_9$) hydrocarbon or a $C_6$ to $C_9$ aliphatic halohydrocarbon. Examples of solvents are hexane, heptane, benzene, toluene, xylene and chlorobenzene. The preferred solvents are toluene and xylene.

The molar ratio of the dialcoholic or diolefinic alkylating agent to diphenylamine may be varied over a very broad to yield products which have the desired level of diphenylamine based repeat units or conversely repeat units which are the result of dimerization of the diolefinic alkylating agent. The preferred range is from 4:1 to 1:4, with the preferred ratios ranging from 2.67:1 to 0.67:1. The method of addition of reactants varies depending upon the type of product desired. A solution of diolefin at 25° C. can be added quickly or dropwise to a stirred refluxing mixture of catalyst and diphenylamine solution. If dialcohol is used it can be added slowly in a boiling solution. The addition of the selected dialcoholic or diolefinic alkylating agent to hot amine solutions maximizes alkylation of the diphenylamine and minimizes olefinic dimerization. If a higher melting, higher molecular weight product is desired, dimerization can be promoted by adding the diolefin solution all at once to the diphenylamine solution before heating begins.

The reactions can be conveniently run at atmospheric pressure, but may also be run at other pressures. Reaction temperature may range from 25° C. to 200° C. with the preferred range being 60° C. to 140° C.

Moieties which are present in the polymeric compounds of this invention may include one or more of the following structures (V), (VI), and (VII):

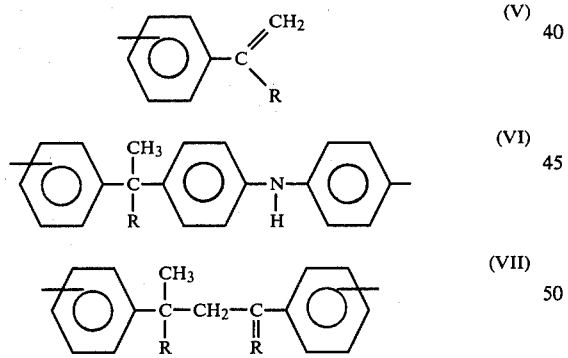

where the R may be any straight chain or branched alkyl group of from 1 to 8 carbon atoms. The substituent group on substantially all of the nitrogen substituted aromatic rings are in the para position relative to the nitrogen. On non-nitrogen substituted aromatic rings, the alkyl groups may have either meta or para orientation to each other depending upon the molecular orientation of the initial reactants.

Nuclear magnetic resonance (NMR) analysis may be used to determine the presence of the structures V, VI and VII and thus partially characterize the polymeric product of a particular reaction condition. The relative percentage of each of the structures V, VI, VII present in the polymeric compound can be determined. The relative percentages are based on the quantity of structure V available for reaction. Where an initial reaction contains a hydroxyl end group it is assumed to dehydrate to the structure V prior to reaction to form VI and VII. The relative percentages of structures V, VI, VII may preferably have the following ranges: Structure V from 0 to about 25 percent; Structure VI from about 30 to nearly 100 percent; and Structure VII from about 1 to about 50 percent.

In addition to NMR characterization, molecular weight can be used to further describe the polymeric compounds of this invention. The molecular weights of the products as determined by gel permeation chromatography may range from about 425 to about 200,000.

Preferred Embodiments

The following examples are intended to illustrate, but not limit, the practice of the present invention. The structural compositions of the products prepared in the following examples were determined by NMR spectroscopy. The structural compositions reported represent the relative percentages of each of the following moieties (A), (B), and (C) based on the initial quantity of (A) available for reaction:

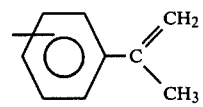

isopropenylphenyl (A)

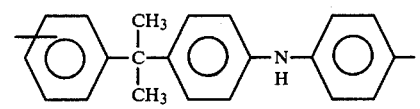

dimethyldiarylmethane (B)

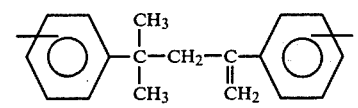

2,4-diphenyl-4-methyl-1-pentene (C)

Molecular weight distributions were determined by gel permeation chromatography (GPC) utilizing 100, 500, 1000, and 10,000 angstrom Micro Styrogel columns (Waters and Associates) and polystyrene standards from Pressure Chemical Company. Molecular weight distributions were calculated as polystyrene equivalents. Mn and Mw are the number and weight average molecular weights, respectively as derived from the GPC analysis. Melting points were determined by the capillary tube method in accordance with ASTM 0-1519. All temperatures are °C. All softening points determined by ring and ball method, ASTM E-28.

SYNTHESIS EXAMPLES

EXAMPLE 1

43.49 grams (0.26 mole) of diphenylamine (DPA) and 1.87 grams (equivalent to 15 weight% of alkylating agent) of Super Filtrol Grade 1 (SF1) were added to 150 milliliters of toluene. The mixture was rapidly stirred and heated to reflux to remove water azeotropically from catalyst and solvent. Enough toluene was then distilled to raise the reflux temperature to 130° C.

A boiling solution of 12.5 grams (0.064 mole) of alkylating agent, specifically 1,4-di-(α-hydroxyisopropyl)- benzene in 200 milliliters of toluene was then added over a 30 minute period. When addition was complete, the reflux temperature had dropped to 112° C. and was maintained there for 30 minutes. 2.3 milliliters of water (67% of theory) had collected in a Dean-Stark trap.

Enough toluene was removed to raise the reflux temperature to 130° C. Reflux was continued for 30 minutes more. 250 milliliters of toluene was then added to facilitate filtration. The solution was filtered at 112° C. to obtain a light yellow filtrate. Rotary evaporation yielded a light pink residue. Excess diphenylamine was distilled off under vacuum at 88° C., 0.05 millimeters of Hg with 22.86 grams being recovered. 25.51 grams of solid light yellow resin remained. The resin was determined to have a ring and ball softening point of 80°–90° C.

EXAMPLES 2–9

The procedure of Example 1 was followed in producing the products summarized below in Table I. The relative ratios of initial reactants were varied in the first three reactions. In the subsequent five reactions the reactant ratio was held constant while the type of acidic clay catalyst was varied.

TABLE I

| Example | Reactant Ratio DPA: Alkylating Agent | Catalyst | Reaction Temperature °C. |
|---|---|---|---|
| 2 | 4:1 | *SF1 | 112–130 |
| 3 | 3:1 | *SF1 | 112–130 |
| 4 | 2:1 | *SF1 | 113–130 |
| 5 | 4:1 | *F-105 | 112–130 |
| 6 | 4:1 | *F-40 | 113–130 |
| 7 | 4:1 | *F-112 | 113–130 |
| 8 | 4:1 | **KSF | 113–200 |
| 9 | 4:1 | **K-10 | 112–130 |

*Acid activated clay from Filtrol Corpoartion, value in parenthesis is mg. of KOH to neutralize 1 gram of clay.
**Acid activated Gridler clays from Chemetron Corporation, value in parenthesis is pH of 5 grams clay in 100 grams water.

EXAMPLES 10–12

Non-solvent, bulk reactions were carried out in the following manner: diphenylamine (DPA) and the second reactant (DIB) were premixed by melting both reactants and blending in the ratio desired for the reaction; the appropriate weight was placed into the reaction vessel; the head space was then flushed with nitrogen gas; the reaction vessel was then sealed and the reactants were preheated to 80° C.; the appropriate amount of boron trifluoride etherate (BF$_3$.OEt$_2$) catalyst was then introduced into the reaction vessel; the vessel was maintained at 80° C. for three hours. Laboratory scale experiments utilized a glass vial as a reaction vessel with a self-sealing rubber lined cap through which the catalyst could be injected without the introduction of oxygen or moisture into the vessel. The reaction was terminated by injecting into the reaction vessel isopropyl alcohol, followed by triethanolamine. The solid product of the reaction was purified by solvating in methylene chloride and precipitating with methanol. The table below summarizes the reactions and molecular weights of the reaction products.

TABLE II

| | BULK POLYMERIZATIONS AT 80° C. | | | | |
|---|---|---|---|---|---|
| Example | Second Reactant DIB | Molar Charge Ratio, DPA:DIB | Catalyst Charge, Moles | Molecular Weight | |
| | | | | Mn | Mw |
| 10 | 1,4-diisoprropenylbenzene | 3.3:3.3 | 0.1 | 2100 | 4700 |
| 11 | 1,4-diisopropenylbenzene | 3.3:3.3 | 0.03 | 2900 | 6300 |
| 12 | 1,3-diisopropenylbenzene | 3.3:3.0 | 0.1 | 6800 | 13700 |

EXAMPLES 13–21

The group of antioxidants shown in Table III were prepared by the following procedure: The appropriate number of moles of diphenylamine (DPA) and catalyst, Super Filtrol Grade 1 (SF1) were added to the solvent and the mixture was brought up to refluxing temperature (110° C. for toluene, 140° C. for xylene); any water present was azeotropically removed from the refluxing mixture. The level of catalyst used in all cases was 15 weight percent based on the weight of diisopropenylbenzene. Once all water had been removed, the appropriate number of moles of 1,4-diisopropenylbenzene (DIB) dissolved in solvent was added by using one of two procedures. In the first, the DIB solution was added dropwise to the stirred refluxing mixture over the period of time designated in Table III, under column headed "DIB Addition." In the second designated "premixed," the DIB solution was premixed with the DPA/SF1 solution prior to bringing the whole mixture to refluxing temperature. After the addition of the DIB by either procedure the mixture was maintained at reflux temperature (110° C. in toluene, 140° C. in xylene) for the number of hours shown in Table III under the column with heading "Reflux."

The specific conditions used to produce each compound is set forth below in Table III. The physical properties of the products produced by the methods described in Examples 13–21 are set forth in Table IV.

TABLE III

| Example | DIB:DPA Molar Ratio | Solvent | DIB Addition | Hours |
|---|---|---|---|---|
| 13 | 0.25:1 | Toluene | 30 min. | 2.5 |
| 14 | 0.50:1 | Toluene | 30 min. | 2.5 |
| 15* | 0.50:1 | Toluene | 30 min. | 2.5 |
| 16 | 1.5:1 | Toluene | Premixed | 5.0 |
| 17 | 1:1 | Toluene | Premixed | 5.0 |
| 18 | 0.67:1 | Toluene | 40 min. | 5.0 |
| 19 | 2.67:1 | Toluene | 4 hours | 1.0 |
| 20 | 2.67:1 | Toluene | 3 hours | 2.0 |
| 21 | 2.67:1 | Xylene | 36 min. | 5.0 |

*Filtrol F-105 (acid number 4.8) was used as catalyst

TABLE IV

| | PHYSICAL PROPERTIES | | | | | |
|---|---|---|---|---|---|---|
| Example | Color | *Molecular Weight | Melting Point °C. | Relative Mole Percent Structure | | |
| | | | | (A) | (B) | (C) |
| 13 | White | NA | NA | NA | NA | NA |
| 14 | Tan | NA | NA | 0 | 100 | 0 |
| 15 | Tan | NA | NA | 0 | 100 | 0 |
| 16 | Off-white | 850, 1750, 1880 | 98–107 | 10 | 72 | 18 |
| 17 | Off-white | 1850 | 92–105 | 0 | 92 | 8 |
| 18 | White | 1045, 1550, 1800 | 166–169 | 0 | 100 | 0 |
| 19 | Off-white | 1840, 2000 | 67–74 | 21 | 51 | 28 |

TABLE IV-continued

| | | PHYSICAL PROPERTIES | | | | |
|---|---|---|---|---|---|---|
| Ex-ample | Color | *Molecular Weight | Melting Point °C. | Relative Mole Percent Structure | | |
| | | | | (A) | (B) | (C) |
| 20 | Lt. Pink | 480 to 2000 | 55–64 | 25 | 43 | 32 |
| 21 | Pink | 1890, 2000 | 74–86 | 23 | 47 | 30 |

*G.P.C. equipment utilized was limited to maximum determination of 2000, higher molecular weight fraction may be present.
N.A. — not available

APPLICATION EXAMPLES

EXAMPLES 22–30

The compositions produced in the reactions described in Examples 2–9 were evaluated for their antioxidant properties by comparison with a commercial control, 4,4′-bis($\alpha,\alpha'$dimethylbenzyl)diphenylamine available through Uniroyal, Inc. under the tradename "Naugard 445", designated as control A.O. in Table V.

These compounds were evaluated by the oxygen absorption test. The oxygen absorption tests were conducted by dissolving in toluene portions of an unstabilized styrene-butadiene rubber (SBR) having 23.5 percent bound styrene, designated SBR 1006. The toluene contained the antioxidant to be tested at a level of 1.00 part of antioxidant per 100 parts of SBR 1006 polymer. The cements so formed were poured onto aluminum foil so as to form a thin film. After drying, the weight of rubber was obtained for each example. Thereafter, the foil with the adhering rubber strip was placed in the oxygen absorption apparatus at 100° C. The time required for each sample to absorb 1.0 percent oxygen was determined and recorded for each sample tested. This testing procedure is described in further detail in Industrial and Engineering Chemistry, 43, p. 456 (1951) and Industrial and Engineering Chemistry, 45, p. 392 (1953).

Table V below shows the results obtained in SBR 1006 at the 1.0 part level at 100° C.

TABLE V

| | OXYGEN ABSORPTION IN SBR 1006 | |
|---|---|---|
| Example | Antioxidant | Hours to Absorb 1% Oxygen |
| 22 | Control A.0 | 380 |
| 23 | Example 2 | 500 |
| 24 | Example 3 | 366 |
| 25 | Example 4 | 598 |
| 26 | Example 5 | 650 |
| 27 | Example 6 | 467 |
| 28 | Example 7 | 508 |
| 29 | Example 8 | 504 |
| 30 | Example 9 | 526 |

EXAMPLES 31–44

Test formulations were devised to evaluate the long term antioxidant effectiveness of diphenylamine-p-diisopropenylbenzene polymers in protecting acrylonitrile-butadiene rubber (NBR) against oxidation. Commercial antioxidants of the conventional non-polymeric substituted diphenylamine-type were run as controls. An unstabilized control was also included as Examples 31 and 36. Control Examples 32 and 38 contained styrenated diphenylamine antioxidant and control Example 37 contained an octylated diphenylmine antioxidant.

The antioxidants to be evaluated were incorporated into the test formulation by using conventional mill mixing techniques: Test Formulation A was silica-reinforced, making it suitable for the production of light colored or white rubber articles. Test Formulation B was carbon black reinforced for use in various mechanical goods applications such as seals, gaskets belts, or hoses requiring oil resistance. All quantities are expressed in parts by weight.

| | Parts |
|---|---|
| Test Formulation A | |
| NBR (28% bound acrylonitrile) | 100.0 |
| Precipitated hydrated silica | 50.0 |
| Zinc Oxide | 5.0 |
| Magnesium Oxide | 5.0 |
| Stearic Acid | 1.0 |
| Polyethylene Glycol (MW 4000) | 2.0 |
| $HSC_3H_6Si(OCH_3)_3$ | 0.5 |
| Spider Sulfur | 0.3 |
| Paraplex G-25 (Rohm and Haas) | 7.50 |
| N—Oxydiethylene Benzolthiazole-2 Sulfenamide | 1.30 |
| Zinc Dimethyldithiocarbamate | 0.30 |
| 4-Morpholinyl-2-Benzolthiazole Disulfide | 2.50 |
| Antioxidant (variable) | 2.00 |
| Test Formulation B | |
| NBR (33% boumd acrylonitrile) | 100.0 |
| Zinc Oxide | 3.00 |
| Magnesium Oxide | 10.00 |
| Stearic Acid | 0.50 |
| Carbon Black | 50.00 |
| Spider Sulfur | 0.25 |
| Tetramethylthiuram disulfide | 2.00 |
| 4-Morpholinyl-2-Benzolthiazole Disulfide | 1.00 |
| Antioxidant (variable) | 2.00 |

Testing was conducted using dumbell specimens cut from 1.52 mm thick cured sheets of each test formulation. The test specimens were placed in a circulating air oven for the prescribed number of hours. The values reported below in Table VI and VII represent the percentage of the original physical property retained after the aging interval. Retained elongation percentages are reported because elongation is of critical importance to the performance of parts, such as hoses, seals, gaskets and belts, made from acrylonitrile-butadiene rubbers (NBR). In addition, reductions in ultimate elongation values are indicative of the crosslinking associated with the oxidative degradation mechanism in NBR. All stress-strain testing values were determined using an Instron tester in accordance with ASTM D-1416.

TABLE VI

| | RETAINED ELONGATION IN FORMULATION A (PERCENTAGE OF ORIGINAL UNAGED ELONGATION) | | | | | |
|---|---|---|---|---|---|---|
| | | AGINGS IN CIRCULATING AIR OVEN | | | | |
| Example | Antioxidant | 168 Hrs. at 121° C. | 120 Hrs. at 135° C. | 168 Hrs. at 135° C. | 24 Hrs. at 149° C. | 48 Hrs. at 149° C. |
| 31 | No A.O.-control | 74 | 2 | * | 30 | 3 |
| 32 | Styrenated DPA-control | 80 | 49 | 17 | 78 | 30 |

TABLE VI-continued

RETAINED ELONGATION IN FORMULATION A
(PERCENTAGE OF ORIGINAL UNAGED ELONGATION)

| | | AGINGS IN CIRCULATING AIR OVEN | | | | |
|---|---|---|---|---|---|---|
| Example | Antioxidant | 168 Hrs. at 121° C. | 120 Hrs. at 135° C. | 168 Hrs. at 135° C. | 24 Hrs. at 149° C. | 48 Hrs. at 149° C. |
| 33 | Example 13 | 89 | 62 | 40 | 77 | 79 |
| 34 | Example 14 | 83 | 55 | 40 | 77 | 78 |
| 35 | Example 15 | 85 | 62 | 35 | 78 | 78 |

*Sample too brittle for testing

TABLE VII

RETAINED ELONGATION IN FORMULATION B
(PERCENT OF ORIGINAL UNAGED ELONGATION)

| | | AGINGS IN CIRCULATING AIR OVEN | | | |
|---|---|---|---|---|---|
| Example | Antioxidant | 70 Hrs. at 135° C. | 120 Hrs. at 135° C. | 168 Hrs. at 135° C. | 48 Hrs. at 149° C. |
| 36 | No A.O.-control | 10 | * | * | 5 |
| 37 | Octylated DPA-control | 31 | 6 | 2 | 10 |
| 38 | Styrenated DPA-control | 30 | 20 | 9 | 24 |
| 39 | Example 16 | 44 | 32 | 16 | 36 |
| 40 | Example 17 | 45 | 30 | 17 | 33 |
| 41 | Example 18 | 42 | 32 | 15 | 35 |
| 42 | Example 19 | 40 | 22 | 9 | 24 |
| 43 | Example 20 | 36 | 22 | 10 | 27 |
| 44 | Example 21 | 39 | 22 | 9 | 27 |

*Sample too brittle for testing

INDUSTRIAL UTILITY

The ability to protect oxidizable polymers from the destructive action of oxidation for substantially longer than currently available materials make these high molecular weight polymeric antioxidants valuable in applications where long term protection is a requirement. Many under-the-hood automotive rubber applications such as belts, hoses, seals and gaskets lend themselves to the use of these polymeric antioxidants for improved performance and prolonged life.

The polymeric reaction products of diphenylamine and dialkyl-alkenylbenzene or dihydroxyalkylbenzene can be used for the protection of oxidizable organic polymers, chiefly rubber and plastic polymers. The rubber polymers include natural rubber, styrene-butadiene rubbers (SBR), acrylonitrile-butadiene rubbers (NBR), polybutadiene, polyisoprene, ethylene-propylene (EP), ethylene-propylene-diene monomer rubbers (EPDM), and polychloroprene. The plastic polymers include polyesters, polyethylene, polypropylene, polybutylene and other polyolefins.

When incorporated into styrene-butadiene rubber, type SBR 1006 as a raw polymer stabilizer, polymeric antioxidants of this invention were found to demonstrate superior antioxidant activity compared to commercially available diaryl-substituted diphenylamines. In an oxygen absorption test in which the reported results are expressed in hours to a 1 percent uptake of oxygen by the test sample, polymeric products of this invention had results of up to 650 hours compared to 380 hours for the commercial control, a diaryl-substituted diphenylamine. This demonstrates superior antioxidant activity.

As demonstrated herein, these polymeric diphenylamine antioxidants can be utilized for protecting both carbon-black and silica-reinforced acrylonitrile-butadiene rubber-based oil resistant, vulcanized rubber articles. Longer useful life can be obtained for rubber parts subjected to high temperature service conditions by the use of the polymeric diphenylamine antioxidants. Specific test results show that rubber compounds protected with these improved antioxidants retain substantially more of their elongation properties during high temperature agings than those protected with recognized commercial antioxidants, styrenated and octylated diphenylamines. Such improved physical property retention can translate to improved long-term performance of hoses, seals, gaskets and belts made from polymers protected with these polymeric diphenylamine antioxidants.

We claim:

1. A a stabilized polymer composition comprising a polymer derived from an ethylenically unsaturated monomer subject to oxidation having incorporated therein an antioxidant amount of a polymeric diphenylamine compound of randomly distributed repeat units derived from diphenylamine and an additional component, said additional component comprising one or more compounds of structural formula (10)

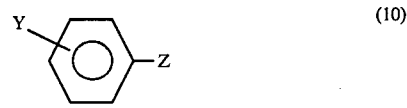

said polymeric compound containing one or more of structures V, VI and VII:

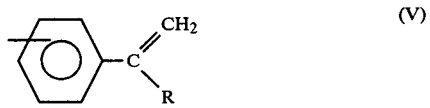

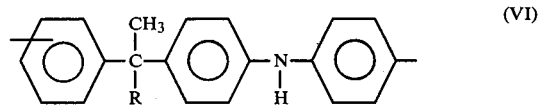

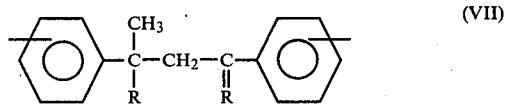

wherein Y is para or meta relative to Z, Y and Z are the same or different radicals selected from the group consisting of

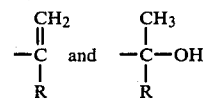

and R is an alkyl radical of from 1 to 8 carbon atoms; said polymeric diphenylamine compound having a molecular weight between 425 to about 200,000.

2. A polymer composition according to claim 1 wherein said additional component is comprised of one or more compounds selected from the group of compounds consisting of structural formulae (I), (II), (III) and (IV):

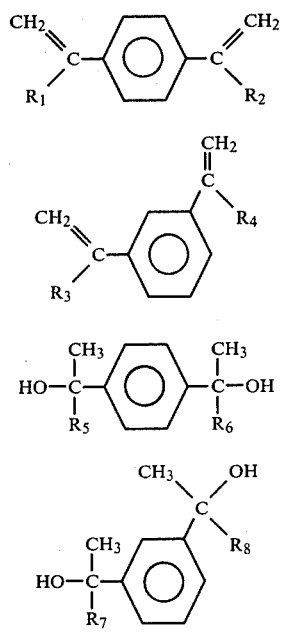

wherein $R_1$, $R_2$, $R_3$, $R_4$, $R_5$, $R_6$, $R_7$, and $R_8$ are the same or different radicals selected from the group consisting of alkyl groups of from 1 to 8 carbon atoms.

3. A polymer composition according to claim 2 wherein $R_1$, $R_2$, $R_3$, $R_4$, $R_5$, $R_6$, $R_7$ and $R_8$ are methyl groups.

4. A polymer composition according to claim 1 wherein said polymer contains carbon-carbon double bonds.

5. A polymer composition according to claim 1 wherein said polymer is selected from the group consisting of styrene-butadiene rubber, acrylonitrile-butadiene rubber, natural rubber and polyisoprene rubber.

6. A polymer composition subject to oxidation of claim 1 wherein the polymeric diphenylamine compound has a molecular weight ranging from about 450 to about 200000.

7. A polymer composition subject to oxidation according to claim 1 wherein 0.001 to 10 parts by weight of said polymeric diphenylamine compound is incorporated per 100 parts by weight of the polymer subject to oxidation.

8. A a stabilized polymer composition comprising a polymer derived from an ethylenically unsaturated monomer subject to oxidation having incorporated therein an antioxidant amount of a polymeric diphenylamine compound prepared by contacting diphenylamine with a second reactant in the presence of an acid catalyst, said second reactant comprising one or more compounds having the structural formula (10)

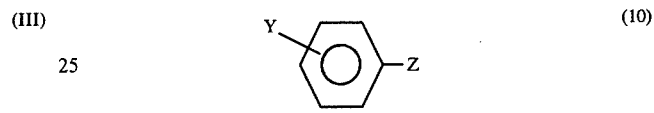

and wherein Y is para or meta relative to Z, Y and Z are the same or different radicals selected from the group consisting of

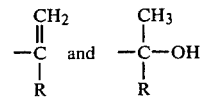

and R is an alkyl radical of from 1 to 8 carbon atoms.

9. A polymer composition subject to oxidation of claim 7 wherein said contacting of diphenylamine and said additional reactant in the presence of an acid catalyst takes place in a solvent.

10. A polymer composition according to claim 9 wherein the acid catalyst is an acid activated clay.

* * * * *

UNITED STATES PATENT AND TRADEMARK OFFICE
CERTIFICATE OF CORRECTION

PATENT NO. : 4,417,017
DATED : Nov. 22, 1983
INVENTOR(S) : Richard E. Gloth and James J. Tazuma It is certified that error appears in the above-identified patent and that said Letters Patent is hereby corrected as shown below:

At column 8, line 46, insert the word "Reflux" directly above the word "Hours".

At column 9, line 30, delete "example" and insert therefor --sample--.

At column 14, line 37, after the word "atoms" insert --; said polymeric diphenylamine compound having a molecular weight between 425 to about 200,000--.

Signed and Sealed this

*Nineteenth* Day of *February 1985*

[SEAL]

*Attest:*

DONALD J. QUIGG

*Attesting Officer*   *Acting Commissioner of Patents and Trademarks*